United States Patent
Peng

(10) Patent No.: US 9,473,517 B2
(45) Date of Patent: *Oct. 18, 2016

(54) CONTENT SCREENING METHOD, APPARATUS AND SYSTEM

(71) Applicant: Huawei Technologies Co., Ltd., Shenzhen (CN)

(72) Inventor: Jin Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

This patent is subject to a terminal disclaimer.

(21) Appl. No.: 14/590,678

(22) Filed: Jan. 6, 2015

(65) Prior Publication Data

US 2015/0121521 A1    Apr. 30, 2015

Related U.S. Application Data

(63) Continuation of application No. 12/500,712, filed on Jul. 10, 2009, now Pat. No. 8,959,625, which is a continuation of application No. PCT/CN2008/071137, filed on May 29, 2008.

(30) Foreign Application Priority Data

May 30, 2007 (CN) .......................... 2007 1 0105808

(51) Int. Cl.
*H04L 29/06* (2006.01)
*G06F 17/30* (2006.01)
*H04L 12/58* (2006.01)

(52) U.S. Cl.
CPC ......... *H04L 63/14* (2013.01); *G06F 17/30867* (2013.01); *H04L 12/585* (2013.01); *H04L 51/12* (2013.01); *H04L 63/10* (2013.01); *H04L 63/126* (2013.01)

(58) Field of Classification Search
CPC .......... G06F 17/30867; H04L 12/585; H04L 63/14; H04L 51/12; H04L 63/10; H04L 63/126
See application file for complete search history.

(56) References Cited

U.S. PATENT DOCUMENTS 6,266,664 B1 * 7/2001 Russell-Falla .... G06F 17/30867
                                                       707/700
7,158,986 B1 * 1/2007 Oliver ............... G06F 17/30702
(Continued)

FOREIGN PATENT DOCUMENTS

| CN | 1863211 A | 11/2006 |
|---|---|---|
| CN | 1917481 A | 2/2007 |

(Continued)

OTHER PUBLICATIONS

Jin et al., "Pre-Categorized Content Format," Doc# OMA-ARC-CBCS-2007-0023-INP Input Contribution, pp. 1-4, Open Mobile Alliance, San Diego, California (Jun. 1, 2007).

(Continued)

*Primary Examiner* — Jeffrey Pwu
*Assistant Examiner* — Nega Woldemariam
(74) *Attorney, Agent, or Firm* — Leydig, Voit & Mayer, Ltd.

(57) ABSTRACT

A content screening method, apparatus and system are provided for a content screening component to verify the trust relationship and the categorization standard used by a categorization component. A method includes the following steps: the content screening component receives a categorized content; and when determining that a first categorization component that categorizes the content is trustworthy according to the information of the categorization component carried in the categorized content, the content screening component screens the content by the content category carried in the categorized content. Another method includes the following step: when determining that the categorization component that categorizes the content uses the same categorization standard as the content screening component according to the information of the categorization component carried in the categorized content, the content screening component screens the content by the content category carried in the categorized content.

10 Claims, 5 Drawing Sheets

(56) References Cited

U.S. PATENT DOCUMENTS

| | | | |
|---|---|---|---|
| 2003/0028622 A1* | 2/2003 | Inoue | G06F 21/6218 709/219 |
| 2003/0105863 A1* | 6/2003 | Hegli | H04L 63/10 709/225 |
| 2003/0182420 A1* | 9/2003 | Jones | G06F 17/30867 709/224 |
| 2003/0195933 A1* | 10/2003 | Curren | G06Q 10/107 709/206 |
| 2004/0158540 A1* | 8/2004 | Zuo | G06Q 10/107 705/408 |
| 2005/0120042 A1* | 6/2005 | Shuster | G06F 17/30867 |
| 2005/0278620 A1* | 12/2005 | Baldwin | H04L 51/12 715/201 |
| 2006/0224682 A1* | 10/2006 | Inmon | G06F 17/27 709/206 |
| 2007/0050445 A1 | 3/2007 | Hyndman | |
| 2007/0233701 A1 | 10/2007 | Sherwood et al. | |
| 2007/0260603 A1 | 11/2007 | Tuscano et al. | |
| 2008/0293387 A1* | 11/2008 | Conn | G06F 17/30817 455/414.1 |
| 2009/0106195 A1* | 4/2009 | Tateno | G06F 17/30616 |
| 2009/0153292 A1* | 6/2009 | Farb | G06F 21/41 340/5.52 |

FOREIGN PATENT DOCUMENTS

| | | |
|---|---|---|
| CN | 101316259 B | 3/2012 |
| EP | 1001614 A1 | 5/2000 |
| JP | 2006018635 A | 1/2006 |

OTHER PUBLICATIONS

"Dictionary for OMA Specifications," OMA-Dictionary-V2_1-20040914-A, V2.1, pp. 1-19, Open Mobile Alliance, San Diego, California (Sep. 14, 2004).

"Categorization Based Content Screening Framework Requirements,"OMA-RD-CBCS-V1_0-20060711-C, Candidate Version 1.0, pp. 1-31,Open Mobile Alliance, San Diego, California (Jul. 11, 2006).

"Categorization Based Content Screening Framework Architecture," OMA-AD-CBCS-V1_0-20070504-D, Draft Version 1.0, pp. 1-18, Open Mobile Alliance, San Diego, California (May 4, 2007).

"Categorization Based Content Screening," OMA-TS-CBCS-V1_0-20090710-C, Candidate Version 1.0, pp. 1-56, Open Mobile Alliance, San Diego, California (Jul. 10, 2009).

"Categorization-Based Content Screening Framework Requirements," OMA-RD-CBCS-V1_0-20051116-D, Draft Version 1.0, pp. 1-21, Open Mobile Alliance, San Diego, California (Nov. 16, 2005).

"Client Side Content Screening Framework Architecture," OMA-AD-Client_Side_CS_FW-V1_0-20060209-C, Candidate Version 1.0, pp. 1-14, Open Mobile Alliance, San Diego, California (Feb. 9, 2006).

"Categorization Based Content Screening Framework Architecture," OMA-AD-CBCS-V1_0-20090212-C, Candidate Version 1.0, pp. 1-25, Open Mobile Alliance, San Diego, California (Feb. 12, 2009).

Ylonen et al., "The Secure Shell (SSH) Protocol Architecture," Network Working Group, Request for Comments: 4251, pp. 1-30, Internet Society, Reston, Virginia (Jan. 2006).

Nilsson, "ID3 Tag Version 2.4.0-Changes," id3v2.4.0-changes.txt, V. 1.1, ID3v2 (Dec. 21, 2000).

Nilsson, "ID3 Tag Version 2.4.0-Native Frames," id3v2.4.0-frames.txt, V. 1.1, ID3v2 (Nov. 1, 2000).

Nilsson, "ID3 Tag Version 2.4.0-Main Structure," id3v2.4.0-structure.txt, ID3v2 (Nov. 1, 2000).

"MPEG-7 Overview (Version 10)," Coding of Moving Pictures and Audio, vol. ISO/IEC JTC1/SC29/WG11-N6828, International Organization for Standardization, London, United Kingdom (Oct. 2004).

* cited by examiner

CONTENT SCREENING METHOD, APPARATUS AND SYSTEM

CROSS-REFERENCE TO RELATED APPLICATIONS

This application is a continuation of U.S. patent application Ser. No. 12/500,712, filed Jul. 10, 2009, which is a continuation of International Patent Application No. PCT/CN2008/071137, filed May 29, 2008, which claims the benefit of priority to Chinese Patent Application No. 200710105808.6, filed May 30, 2007, all of which are incorporated herein by reference in their entireties.

FIELD OF THE DISCLOSURE

The present disclosure relates to network and communication fields, and in particular, to a content screening method, apparatus, and system.

BACKGROUND OF THE DISCLOSURE

With enhanced capabilities of mobile terminals, mobile subscribers may enjoy richer mobile services. On the other hand, mobile subscribers are disrupted by illegal information, junk mails, mobile phone viruses, and porn content. Subscribers hope to eliminate such illegal and disruptive information. In turn, mobile operators hope to defend their networks against mobile phone viruses and junk mails and provide subscribers with high quality services, thus increasing profits. To meet these requirements, the Open Mobile Alliance sets up a categorization-based content screening (CBCS) working group, aiming to provide a method for protecting subscribers from accessing improper contents.

Currently, contents are represented by metadata.

For example, ID3 tags are a technology widely used in media players. The ID3 tag of an MP3 file includes such information as singer name, music name, year, and music style. Except the Style (Genre) attribute, there are no categorization related contents in the ID3 tags.

In another example, MPEG-7 is a standard for the metadata of audio contents or video contents. The categorization information in the MPEG-7 includes style, topic, purpose, language, categorization, parent guide type, and topic preview.

In a specific implementation, the preceding MPEG-7 may be described through a media description scheme (MDS). In the MDS, a classification DS is used to describe the categorization information of the contents.

During the implementation of the present disclosure, the following problems were discovered: There may be multiple producers of categorization information (for example, a CBCS categorization component and a content provider that supports the CBCS categorization component) and multiple consumers of categorization information (for example, a CBCS content screening component and a client that supports the CBCS metadata format) in the CBCS. However, the classification DS of the MPEG-7 in the conventional art supports only the description scheme (for example, Motion Picture Association (MPA) and Internet Content Rating Association (ICRA)), categorization type (for example, PG-13 and PG), country, language, and style. Thus, the consumers and producers of the categorization information cannot verify the trust relationship of the categorization component by using a content screening component and perform the screening operation only after it is determined that the categorization component is trustworthy.

SUMMARY OF THE DISCLOSURE

Embodiments of the present disclosure provide a content screening method, apparatus and system so that the content screening component can verify the trust relationship and the categorization standard used by the categorization component.

A content screening method provided in an embodiment of the present disclosure includes: by a content screening component, receiving a categorized content; and when determining that a first categorization component that categorizes the content is trustworthy according to information of the categorization component carried in the categorized content, screening the content by the content category carried in the categorized content.

A content screening component provided in an embodiment of the present disclosure includes: a receiving unit adapted to receive a categorized content; a reading unit, adapted to read information of a categorization component and a content category carried in the categorized content received by the receiving unit; a judging unit adapted to send out a first trigger signal when determining that a first categorization component that categorizes the content is trustworthy according to the information of the categorization component read by the reading unit; and a screening unit adapted to receive the first trigger signal sent from the judging unit, and screen the content received by the receiving unit by using the received first trigger signal as the trigger condition and the content category read by the reading unit.

A content screening system provided in an embodiment of the present disclosure includes: a first categorization component adapted to categorize a content initially, and add the information of the first categorization component to the categorized content; and a content screening component adapted to receive the categorized content, and screen the content according to the content category carried in the categorized content when determining that the first categorization component that categorizes the content is trustworthy according to the information of the categorization component carried in the categorized content.

Another content screening method provided in an embodiment of the present disclosure includes: by a content screening component, when determining that a categorization component that categorizes a content uses the same categorization standard as the content screening component according to the information of the categorization component carried in the categorized content, screening the content according to the content category carried in the categorized content.

Another content screening component provided in an embodiment of the present disclosure includes: a reading unit adapted to read the information of a categorization component and a content category carried in a categorized content; a judging unit adapted to send out a first trigger signal when determining that the categorization component that categorizes the content uses the same categorization standard as the content screening component according to the information of the categorization component read by the reading unit; and a screening unit adapted to receive the first trigger signal sent from the judging unit, and screen the content by using the received first trigger signal as the trigger condition and the content category read by the reading unit.

Different from the conventional art, embodiments of the present disclosure carry the information of the categorization component in the categorized content. Thus, the content screening component can verify the trust relationship of the categorization component, and perform the screening operation when determining that the categorization component is trustworthy. Besides, the content screening component can verify the categorization standard used by the categorization component, and perform the screening operation when determining that the categorization component uses the same categorization standard as the content screening component.

DETAILED DESCRIPTION OF THE DISCLOSURE

Figure 1:
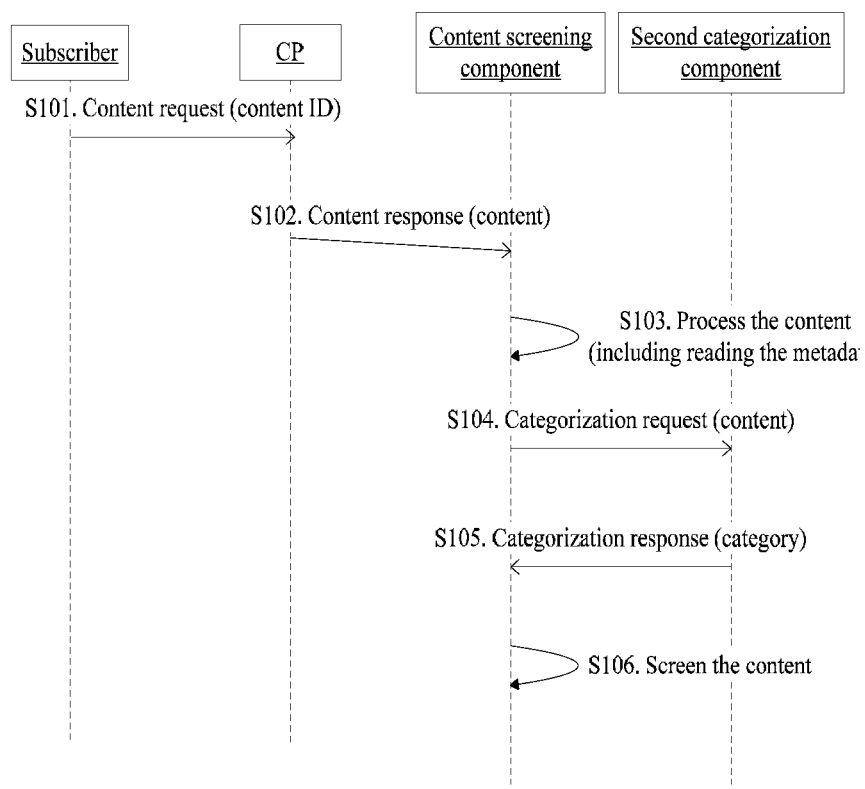
FIG. 1 is a flowchart of a content screening method provided in a first embodiment of the present disclosure.

The purpose of the embodiments of the present disclosure is to enable the content screening component to verify the trust relationship and the categorization standard used by the categorization component. In the embodiments of the present disclosure, the MPEG-7 categorization related parts is extended by a CategorizationEntity element that is added to the classification DS. The details are shown as follows:

```
<complexTypename="Classification">
    <element ref="Country" minOccurs="0"
maxOccurs="unbounded"/>
    <element name="Language" type="language" minOccurs="0"
maxOccurs="unbounded"/>
    <element name="Genre" type="mds:ControlledTerm"
        minOccurs="0" maxOccurs="unbounded"/>
    <element name="PackagedType" type="mds:ControlledTerm"
        minOccurs="0" maxOccurs="unbounded"/>
    <element name="Purpose" type="mds:ControlledTerm"
        minOccurs="0" maxOccurs="unbounded"/>
    <element name="AgeClassification"
type="mds:ControlledTerm"
        minOccurs="0" maxOccurs="unbounded"/>
    <element name="ParentalGuidance"
type="mds:ParentalGuidance"
        minOccurs="0" maxOccurs="unbounded"/>
    <element name="MarketClassification"
type="mds:ControlledTerm"
minOccurs="0"/>
    <element name="CategorizationEntity"
type="cbcs:CategorizationEntity"
minOccurs="0"/>
    <attribute name="id" type="ID"/>
</complexType>
```

The new CategorizationEntity element is used to describe the information of the categorization component. The following shows the structure of the CategorizationEntity element.

```
<complexType name="CategorizationEntity">
    <element name="Name" type="mds:ControlledTerm"
        minOccurs="0"
maxOccurs="unbounded">
    <element name="Country" type="ISO3166-1CountryCode"
        minOccurs="0"
maxOccurs="1">
    <attribute name="id" type="ID"/>
</complexType>
```

The element name="Name" is a first extended element. The first extended element is ID information of the categorization component. The ID information may be a Name element that indicates the name of the categorization component or an ID element that indicates the ID of the categorization component. The Name element and the ID element are used as the ID information.

The element name="Country" is a second extended element. The second extended element is information of the categorization standard of the categorization component. The information of the categorization may be a Country element that indicates the country where the categorization component is located, a CategorizationScheme element that indicates the categorization scheme used by the categorization component, or an Operator element that indicates the operator to which the categorization component belongs. Any combination of the Country element, CategorizationScheme element and Operator element may be used as the information of the categorization standard.

The first extended element and the second extended element may coexist or exist separately according to the requirements of a specific embodiment.

It should be noted that the method is not limited to extending the MPEG-7 categorization related parts. The information of the categorization component may, for example, be added to the content by adding elements to other metadata.

Based on the extension, the following describes nine embodiments.

Embodiment 1

This embodiment provides a content screening method so that the content screening component can verify the trust relationship. As shown in FIG. 1, the method includes the following steps:

S101. The subscriber sends a content request that carries a content ID to the content provider (CP).

S102. The CP sends the corresponding categorized content to the subscriber through the network according to the content ID. During the transmission, the corresponding categorized content passes through the content screening component.

S103. The content screening component reads the metadata of the content that includes the content category and information of the categorization component. Further, the information of the categorization component includes the ID or the name of a first categorization component that categorizes the content. The content screening component checks whether the ID or name of the first categorization component is in a trust list of the content screening component. If the ID or name of the first categorization component is in the trust list of the content screening component, the process goes to S106.

If the ID or name of the first categorization component is not in the trust list of the content screening component, the content screening component may take other measures; for example, the process goes to S104 or the screening operation is terminated directly. If the process goes to S104, the content screening component may obtain the trusted content category, thus supporting the trust model between the components in the CBCS system.

S104. The content screening component selects any categorization component from the trust list as a trusted second categorization component (furthermore, each categorization component in the trust list may be assigned a priority, and the content screening component selects the second categorization component in the descending order of priorities), and sends a categorization request that carries the content or content description information to the second categorization component.

S105. The second categorization component returns the content category corresponding to the content to the content screening component.

S106. The content screening component screens the content according to the content category obtained from the trusted categorization component (i.e., the first categorization component if the process is continued from S103, or the second categorization component if the process is continued from S105).

The preceding trust list includes multiple items, each of which represents a categorization component trusted by the screening component and includes the ID and name of the corresponding categorization component. The trust list may be saved in XML format. The following gives an example:

```
<WhiteList ScrComponentID="HuabeiCBCS-SC-001" count="3">
    <CatComponent
    ID="HuabeiCBCS-CC-001">...</CatComponent>
    <CatComponent ID ="CMCCCBCS-CC-001" name=" China
Mobile Content Categorization Server - South China Central Server
(compliant with the ICRA standard)" >...</CatComponent>
    <CatComponent ID="MPACBCS-CC-001" name="MPA
Categorization Server - Asia Pacific">...</CatComponent>
</WhiteList>
```

Based on the trust list saved in XML format, the screening server of Huabei Company considers that the categorization information in the content categorized by the No. 001 categorization server of Huabei Company, China Mobile South China Central Server, and MPA Asia Pacific Server is trustworthy. Contents categorized by other categorization servers need to be re-categorized.

It should be noted that the trust list may be stored in the content screening component or an external component and is already preset before the categorization process begins.

If the trust list is stored in the content screening component, the content screening component provides an interface and operation functions to allow the external component to add, delete, modify or search the trust list.

If the trust list is stored in the external component, the external component provides an interface and operation functions to allow adding, deleting, modifying or searching the trust list. In addition, the content screening component may call the operation functions to obtain and set the trust list.

Embodiment 2

This embodiment supports the scenario of the trust model between the components in the CBSC system.

Suppose the following: a categorization component A is a categorization component trusted by a screening component C; a categorization component B is a categorization component not trusted by the screening component C; the screening component C is a screening component; a content 1 is a content categorized by the categorization component B; and Bob is an end user.

The method of the embodiment includes the following steps:

1. Bob requests content 1 of the CP. The CP sends content 1 to Bob through a mobile network.

2. The content 1 passes through the content screening component C. The content screening component C reads the metadata of content 1 and determines that the content is categorized by categorization component B.

3. The content screening component C does not trust categorization component B according to the trust rule of content screening component C, for example, a trust list. Thus, the content screening component C sends a request for re-categorizing content 1 to categorization component A.

4. The categorization component A re-categorizes content 1, and adds the categorization information to the metadata of content 1.

5. The categorization component A sends content 1 that carries the categorization information or category information and metadata of content 1 to the screening component B.

6. The content screening component C screens the content 1 according to the screening rule.

7. The content screening component C sends the screened content 1 to Bob.

Embodiment 3

Figure 2:
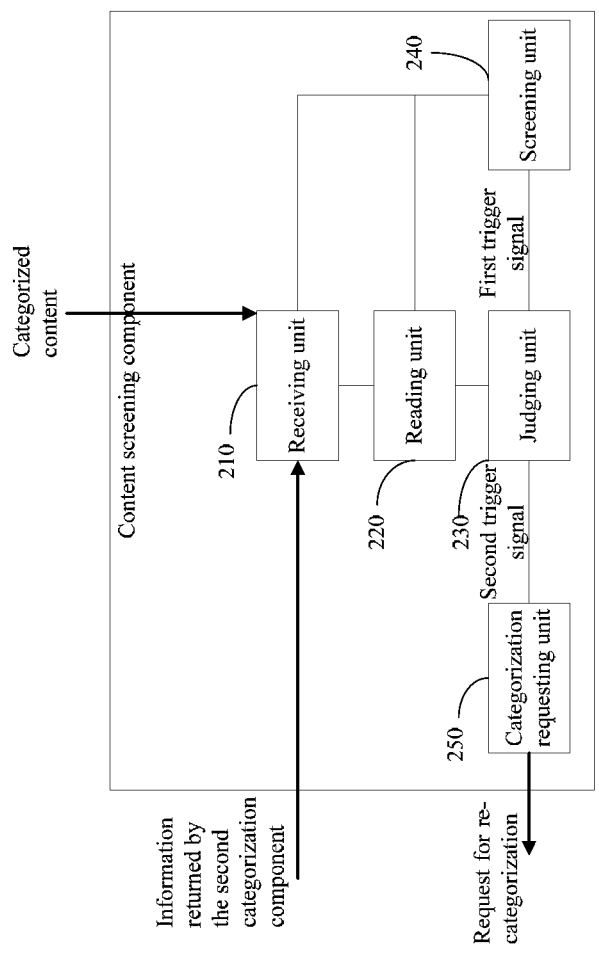
FIG. 2 shows a structure of a content screening component provided in a third embodiment of the present disclosure.

This embodiment provides a content screening component so that the content screening component can verify the trust relationship. As shown in FIG. 2, the content screening component includes a receiving unit 210, a reading unit 220, a judging unit 230, and a screening unit 240. To ensure that the content screening component can obtain the trusted content category and support the trust model between the components in the CBCS system, the content screening component may further include a categorization requesting unit 250.

The receiving unit 210 is adapted to receive a categorized content.

The reading unit 220 is adapted to read information of the categorization component and content category carried in the categorized content that is received by the receiving unit 210.

The judging unit 230 is adapted to send out a first trigger signal when determining that a first categorization component that categorizes the content is trustworthy according to the information of the categorization component read by the reading unit 220.

The screening unit 240 is adapted to receive the first trigger signal sent from the judging unit 230, take the received first trigger signal as a trigger condition and screen the content received by the receiving unit 210 according to the content category read by the reading unit 220.

The judging unit 230 is adapted to send out a second trigger signal when determining that the first categorization component that categorizes the content is not trustworthy according to the information of the categorization component read by the reading unit 220.

The categorization requesting unit 250 is adapted to receive the second trigger signal sent from the judging unit 230, take the received second trigger signal as the trigger condition and request a trusted second categorization component to re-categorize the content received by the receiving unit 210.

The receiving unit 210 is further adapted to receive the information returned by the second categorization component.

The reading unit 220 is further adapted to read the content category upon re-categorization from the information that is returned by the second categorization component and received by the receiving unit.

The screening unit 240 is further adapted to screen the content received by the receiving unit 220 by using the content category upon re-categorization read by the read unit 220.

Embodiment 4

Figure 3:
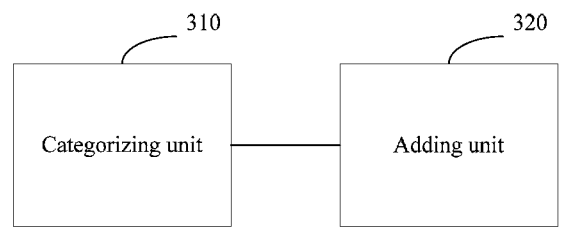
FIG. 3 shows a structure of a categorization component provided in a fourth embodiment of the present disclosure.

This embodiment provides a categorization component so that the content screening component can verify the trust relationship. As shown in FIG. 3, the categorization component includes: a categorizing unit 310 and an adding unit 320.

The categorizing unit 310 is adapted to categorize a content. The adding unit 320 is adapted to add the information of the categorization component to the content categorized by the categorizing unit.

Embodiment 5

Figure 4:
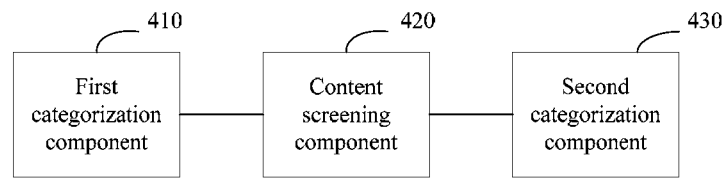
FIG. 4 shows a structure of a content screening system provided in a fifth embodiment of the present disclosure.

This embodiment provides a content screening system so that the content screening component can verify the trust relationship. As shown in FIG. 4, the content screening system includes a first categorization component 410 and a content screening component 420. To ensure that the content screening component can obtain the trusted content category and support the trust model between the components in the CBCS system, the content screening system may further include a second categorization component 430.

The first categorization component 410 is adapted to categorize a content initially and add the information of the first categorization component to the categorized content.

The content screening component 420 is adapted to: receive the categorized content; screen the content according to the content category carried in the categorized content when determining that the first categorization component 410 that categorizes the content is trustworthy according to the information of the categorization component carried in the categorized content; and send out a categorization request and screen the content according to the returned content category when determining that the first categorization component 410 that categorizes the content is not trustworthy according to the information of the categorization component carried in the categorized content.

The second categorization component 430 is adapted to receive the categorization request sent from the content screening component 420 and return the content category. There is a trust relationship between the second categorization component 430 and the content screening component.

Embodiment 6

Figure 5:
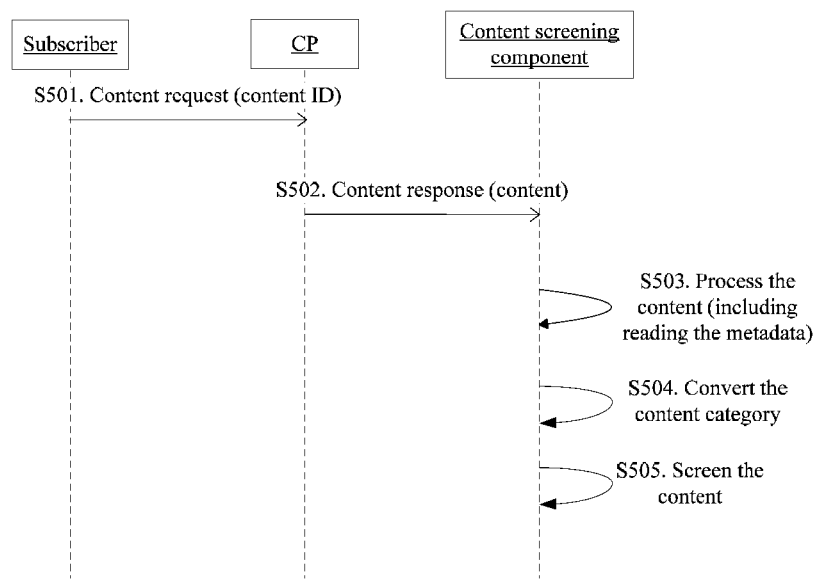
FIG. 5 is a flowchart of a content screening method provided in a sixth embodiment of the present disclosure.

This embodiment provides a content screening method so that the content screening component can verify the categorization standard used by the categorization component. As shown in FIG. 5, the method includes the following steps:

S501. The subscriber sends a content request that carries a content ID to the CP.

S502. The CP sends the corresponding categorized content to the subscriber through the network according to the content ID. During the transmission, the categorized content passes through the content screening component.

S503. The content screening component reads the metadata of the content to be screened, which includes the content category and information of the categorization component that categorizes the content. The information of the categorization component includes the name of the country where the categorization component is located or the categorization scheme used by the categorization component.

The content screening component judges whether the categorization component uses the same categorization standard as that used by the content screening component, for example, whether the categorization component uses the same categorization scheme as that used by the content screening component or whether the categorization component is located in the same country as the content screening component. If the categorization component uses the same categorization standard as that used by the content screening component, the process goes to S505.

If the categorization component doesn't use the same categorization standard as that used by the content screening component, the content screening component may take other measures, for example, the process may go to S504 or the screening operation terminated directly. If the process goes to S504, the converting of the content category is supported when the categorization component uses a categorization standard different from that used by the content screening component.

S504. The content screening component converts the content category into a content category corresponding to the categorization standard used by the content screening component according to the categorization mapping table.

S505. The content screening component screens the content according to the content category.

The preceding categorization standard may be the following items or any combination thereof: categorization scheme (e.g., MPA categorization scheme, such as, for example, PG and PG-13, and ICRA categorization scheme); country attribute; and operator attribute.

The categorization mapping table mentioned in S504 is a table stored in the screening component. The categorization mapping table records the mapping (rule) between the category generated by using a categorization scheme in the received content of one country and the category of the standard used by the content screening component. For example,

```
<rules>
    <rule>
        <criteria>
            <country>jp</country>
            <CAT>"Pop"</CAT>
        <criteria>
        <action>CAT="J-Pop"</action>
    </rule>
    <rule>
        <criteria>
            <country>us</country>
            <scheme>MPA</scheme>
            <CAT>PG-13</CAT>
        </criteria>
        <action>CAT="PG-16"</action>
    </rule>
</rules>
```

In this example, the content of the Pop category from Japan may be re-labeled as J-Pop according to the mapping table; and the content restricted for teenagers below 13 years old according to the MPA standard in the United States of America will be re-labeled as the content restricted for teenagers below 16 years old.

Embodiment 7

This embodiment supports the scenario in which the content category may be converted when a categorization component and a content screening component are located in different countries.

Suppose a categorization component A is a categorization component located in Japan; a content screening component B is a screening component located in China; and a content 1 is a popular song in Japan.

1. The content screening component B requests the categorization component A to categorize the content 1.

2. The categorization component A categorizes the content 1, and adds the categorization information to the metadata of the content 1, where the value of the Genre is set to Pop and the value of the ClassificationEntity/Country is set to jp.

3. The categorization component A sends the content 1 that carries the categorization information to the content screening component B.

4. The content screening component B reads the metadata of the content 1 and obtains Genre=Pop and ClassificationEntity/Country=jp. The content screening component B changes the value of Genre to J-Pop according to the category conversion rule set by the content screening component B.

5. The content screening component B screens the content 1 according to the screening rule.

Embodiment 8

Figure 6:
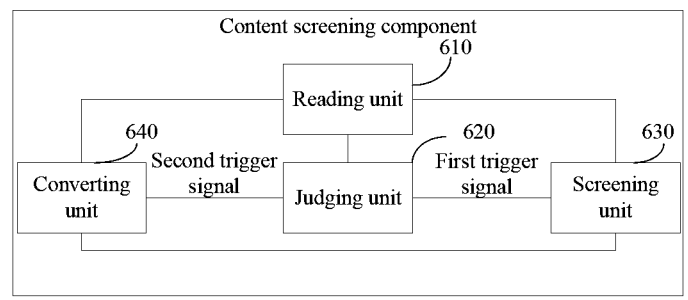
FIG. 6 shows a structure of a content screening component provided in an eighth embodiment of the present disclosure.

This embodiment provides a content screening component so that the content screening component can verify the categorization standard used by the categorization component. As shown in FIG. 6, the content screening component includes a reading unit 610, a judging unit 620, and a screening unit 630. To support the conversion of a content category when the categorization component uses a categorization standard different from that used by the content screening component, the content screening component may further include a converting unit 640.

The reading unit 610 is adapted to read information of the categorization component and content category carried in a categorized content.

The judging unit 620 is adapted to send out a first trigger signal when determining that the categorization component that categorizes the content uses the same categorization standard as the content screening component according to the information of the categorization component read by the reading unit 610.

The screening unit 630 is adapted to receive the first trigger signal sent from the judging unit 620, take the received first trigger signal as a trigger condition and screen the content read by the reading unit 610 according to the content category read by the reading unit 610.

The judging unit 620 is further adapted to send out a second trigger signal when determining that the categorization component that categorizes the content uses a categorization standard different from that used by the content screening component according to the information of the categorization component read by the reading unit 610.

The converting unit 640 is adapted to: receive the second trigger signal sent from the judging unit 620; take the received second trigger signal as the trigger condition and convert the content category read by the reading unit 610 into a content category corresponding to the categorization standard used by the content screening component; and output the content category upon conversion.

The screening unit 630 is further adapted to screen the content by using the content category sent from the converting unit.

Embodiment 9

This embodiment provides a content screening method to support the trust model between the components in the CBCS system and the conversion of a content category when the categorization component uses a categorization standard different from that used by the content screening component. The method includes the following steps:

1. The subscriber sends a content request that carries a content ID to the CP.

2. The CP sends the corresponding categorized content to the subscriber through the network according to the content ID. During the transmission, the corresponding categorized content passes through the content screening component.

3. The content screening component reads the metadata of the content that includes the content category and information of the categorization component. The information of the categorization component includes the ID or name of the first categorization component that categorizes the content, and the country where the first categorization component is located or the categorization scheme used by the first categorization component. The content screening component checks whether the ID or name of the first categorization component is in the trust list of the content screening component. If so, the process goes to step 6; otherwise, the process goes to step 4.

4. The content screening component selects any categorization component from the trust list as the trusted second categorization component, and sends a categorization request that carries the content or content description information to the second categorization component.

5. The second categorization component returns the category corresponding to the content to the content screening component. The second categorization component also returns the information of the second categorization component that includes the name of the country where the second categorization component is located or the categorization scheme used by the second categorization component.

6. After obtaining the content category from the trustable categorization component (i.e., the first categorization component if the process is continued from step 3 or the second categorization component if the process is continued from step 5), the content screening component judges whether the trustable categorization component uses the same categorization standard as the content screening component according to the country where the trustable categorization component is located or the categorization scheme used by the trustable categorization component. If so, the content screening component screens the content according to the content category obtained from the trustable categorization component; otherwise, the content screening component converts the content category obtained from the trustable categorization component into a content category corresponding to the categorization standard used by the content screening component according to the categorization mapping table, and screens the content according to the content category upon conversion.

The categorization mapping table mentioned in step 6 is a table stored in the screening component. The categorization mapping table records the mapping (rule) between the category generated by using a categorization scheme in the received content of one country and the category of the standard used by the content screening component. For example,

```
<rules>
    <rule>
        <criteria>
            <country>jp</country>
            <CAT>"Pop"</CAT>
        <criteria>
        <action>CAT="J-Pop"</action>
    </rule>
    <rule>
        <criteria>
            <country>us</country>
            <scheme>MPA</scheme>
            <CAT>PG-13</CAT>
        </criteria>
        <action>CAT="PG-16"</action>
    </rule>
</rules>
```

In this example, the content of the Pop category from Japan may be re-labeled as J-Pop according to the mapping table; and the content restricted for teenagers below 13 years old according to the MPA standard in USA will be re-labeled as the content restricted for teenagers below 16 years old.

In conclusion, the embodiments of the present disclosure carry the information of the categorization component in the categorized content so that the content screening component can verify the trust relationship of the categorization component and perform a screening operation after determining that the categorization component is trustworthy.

Furthermore, if the content screening component determines that the categorization component is not trustworthy, it may take measures; for example, the content screening component sends a request for re-categorization to other trustable categorization components. This ensures that the content screening component can obtain the content category determined by the trustable categorization component, thus supporting the trust model between the components in the CBCS system.

In addition, in this the ninth embodiment, the first embodiment and the sixth embodiment may be combined. On the one hand, this can ensure that the content screening component obtains the content category determined by the trustable categorization component, thus supporting the trust model between the components in the CBCS system; on the other hand, this can ensure that the content screening component determines the content category according to its own categorization standard, thus supporting the conversion of the content category when the categorization component uses a categorization standard different from that used by the content screening component. Thus, the embodiments of the present disclosure achieve better results.

The embodiments of the present disclosure carry the information of the categorization component in the categorized content. Therefore, the content screening component can verify the categorization standard used by the categorization component, and perform a screening operation after determining that the categorization component uses the same categorization standard as the content screening component.

Further, if the content screening component determines that the categorization component uses a categorization standard different from that used by the content screening component, the content screening component converts the content category carried in the categorized content into a content category corresponding to the categorization standard used by the content screening component, and screens the content by the content category upon conversion. This can ensure that the content screening component determines the content category according to its own categorization standard, thus supporting the conversion of the content category when the categorization component uses a categorization standard different from that used by the content screening component.

Through the foregoing embodiments, it is understandable to those skilled in the art that the embodiments of the present disclosure may be implemented through software and a necessary general hardware platform or through hardware only. However, in most cases, software and a general hardware platform are preferred. Based on such understandings, the technical solution of the present disclosure or contributions to the conventional art may be embodied by software products. The software products are stored in a storage medium and incorporate several instructions to instruct a computer device, for example, a personal computer, a server, or a network device, to execute the method provided by each embodiment of the present disclosure.

Although the present disclosure has been described through several exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A content screening method, comprising:
   receiving, by a content screening component, a categorized content, wherein the categorized content comprises:
   a content category of the categorized content, and information of a first categorization component, wherein the categorized content is categorized by the first categorization component, and the content category is provided by the first categorization component;
   screening, by the content screening component, the categorized content according to the content category upon the content screening component determining that the first categorization component that categorizes the categorized content is trusted by the content screening component according to the information of the first categorization component;
   requesting, upon determining by the content screening component that the first categorization component is not trusted by the content screening component, a trusted second categorization component to re-categorize the categorized content, and
   screening the categorized content according to a returned content category from the trusted second categorization component.

2. The content screening method of claim 1, wherein the information of the first categorization component carried in the categorized content comprises identity (ID) information of the first categorization component, the method further comprises:

judging, by the content screening component, whether the first categorization component is trusted by the content screening component based on whether the ID information of the first categorization component is in a trust list of the content screening component.

3. The content screening method of claim 1, further comprising:

selecting, by the content screening component, any categorization component from a trust list of the content screening component as the trusted second categorization component.

4. The content screening method of claim 1, further including:

receiving, by the content screening component, the information of the trusted second categorization component returned by the trusted second categorization component after re-categorizing the categorized content.

5. The content screening method of claim 1, further including:

screening, by the content screening component, after obtaining the content category of the categorized content from the trusted second categorization component, the categorized content according to the content category obtained from the trusted second categorization component when determining that the trusted second categorization component uses a same categorization standard as the content screening component according to the information of the categorization component.

6. The content screening method of claim 1, further including:

converting, by the content screening component, after obtaining the content category of the content from the trusted second categorization component, the content category obtained from the trusted categorization component into a content category corresponding to the categorization standard used by the content screening component, and screening the categorized content by the content category upon the conversion, when determining that the trusted second categorization component uses a categorization standard different from that used by the content screening component.

7. The content screening method of claim 6, wherein the information of the first categorization component comprises categorization standard information of the trusted categorization component, the method further comprises:

converting, by the content screening component, when determining that the trusted second categorization component uses the categorization standard different from that used by the content screening component according to the categorization standard information of the trusted categorization component, the content category obtained from the trusted categorization component into a content category corresponding to the categorization standard used by the content screening component according to a categorization mapping table.

8. The content screening method of claim 1, wherein before the content screening component receives the categorized content, the method further comprises:

categorizing, by the first categorization component, the categorized content; and
    adding the information of the first categorization component to the categorized content by adding elements to metadata.

9. A content screening component, comprising at least a processor circuitry operating in conjunction with at least a memory storing codes in a plurality of units, which cause the content screening component to perform content screening, wherein the plurality of units comprises:

a receiving unit, configured to receive a categorized content, wherein the categorized content comprises:
    a content category of the categorized content, and information of a first categorization component, wherein the categorized content is categorized by the first categorization component and the content category is provided by the first categorization component;
    a reading unit, configured to read the information of the first categorization component and the content category carried in the categorized content received by the receiving unit;
    a judging unit, configured to send out a first trigger signal when determining that the first categorization component is trusted by the content screening component according to the information of the categorization component read by the reading unit;
    a screening unit, configured to receive the first trigger signal sent from the judging unit, and, in response to the first trigger signal, screen the categorized content received by the receiving unit according to the content category read by the reading unit;
    wherein the judging unit is further configured to send out a second trigger signal upon determining that the first categorization component that categorizes the categorized content is not trusted by the content screening component according to the information of the categorization component read by the reading unit;
    the plurality of units further comprises: a categorization requesting unit configured to receive the second trigger signal sent from the judging unit, and, in response to the second trigger signal, request a trusted second categorization component to re-categorize the categorized content received by the receiving unit;
    the receiving unit is further configured to receive the information returned by the second categorization component;
    the reading unit is further configured to read the content category upon re-categorization from the information that is returned by the second categorization component and received by the receiving unit; and
    the screening unit is further configured to screen the content received by the receiving unit using the content category upon re-categorization that is read by the reading unit.

10. A computer program product comprising a non-transitory computer readable medium storing computer executable instructions, wherein the instructions, when executed by a content screening component, cause the content screening component to perform the following:

receiving, a categorized content comprising:
    a content category of the categorized content, and information of a first categorization component, wherein the categorized content is categorized by the first categorization component, and the content category is provided by the first categorization component;
    screening, the categorized content according to the content category upon the content screening component determining that the first categorization component that categorizes the categorized content is trusted by the content screening component according to the information of the first categorization component;

requesting, upon determining by the content screening component that the first categorization component is not trusted by the content screening component, a trusted second categorization component to re-categorize the categorized content, and screening the categorized content according to a returned content category from the trusted second categorization component.

\* \* \* \* \*